United States Patent [19]
Dunn

[11] 3,844,096
[45] Oct. 29, 1974

[54] BRUSH AND TREE MASTICATOR

[76] Inventor: Thomas J. Dunn, P.O. Box 110, Hackettstown, N.J. 07840

[22] Filed: Aug. 16, 1973

[21] Appl. No.: 388,808

[52] U.S. Cl. ............................................... 56/504
[51] Int. Cl. ........................................... A01d 49/00
[58] Field of Search ............ 56/504, 505, 500, 294, 56/12.7, 13.1, 13.2

[56] References Cited
UNITED STATES PATENTS

| | | | |
|---|---|---|---|
| 2,974,472 | 3/1961 | Gebhart | 56/504 |
| 2,987,868 | 6/1961 | Cunningham | 56/504 |
| 3,147,577 | 9/1964 | McClellan et al. | 56/504 |
| 3,309,854 | 3/1967 | Mitchell et al. | 56/504 |
| 3,574,989 | 4/1971 | Rousseau et al. | 56/504 |

Primary Examiner—Russell R. Kinsey
Attorney, Agent, or Firm—Robert G. McMorrow

[57] ABSTRACT

A unitary shredder for vegetation has a housing with side plates. A motor mounted on the housing is operatively linked to a main axle rotatably secured between the side plates. A series of discs are carried on the axle and have shafts projecting therethrough in outwardly spaced and parallel relation to the axle, said shafts carrying U-form knives. Enlarged arms project from the plates forwardly and outwardly to gather vegetation in the path of travel and direct same to the knives. Deflector plates prevent entry of vegetation between the side plates and the respective adjacent discs.

9 Claims, 9 Drawing Figures

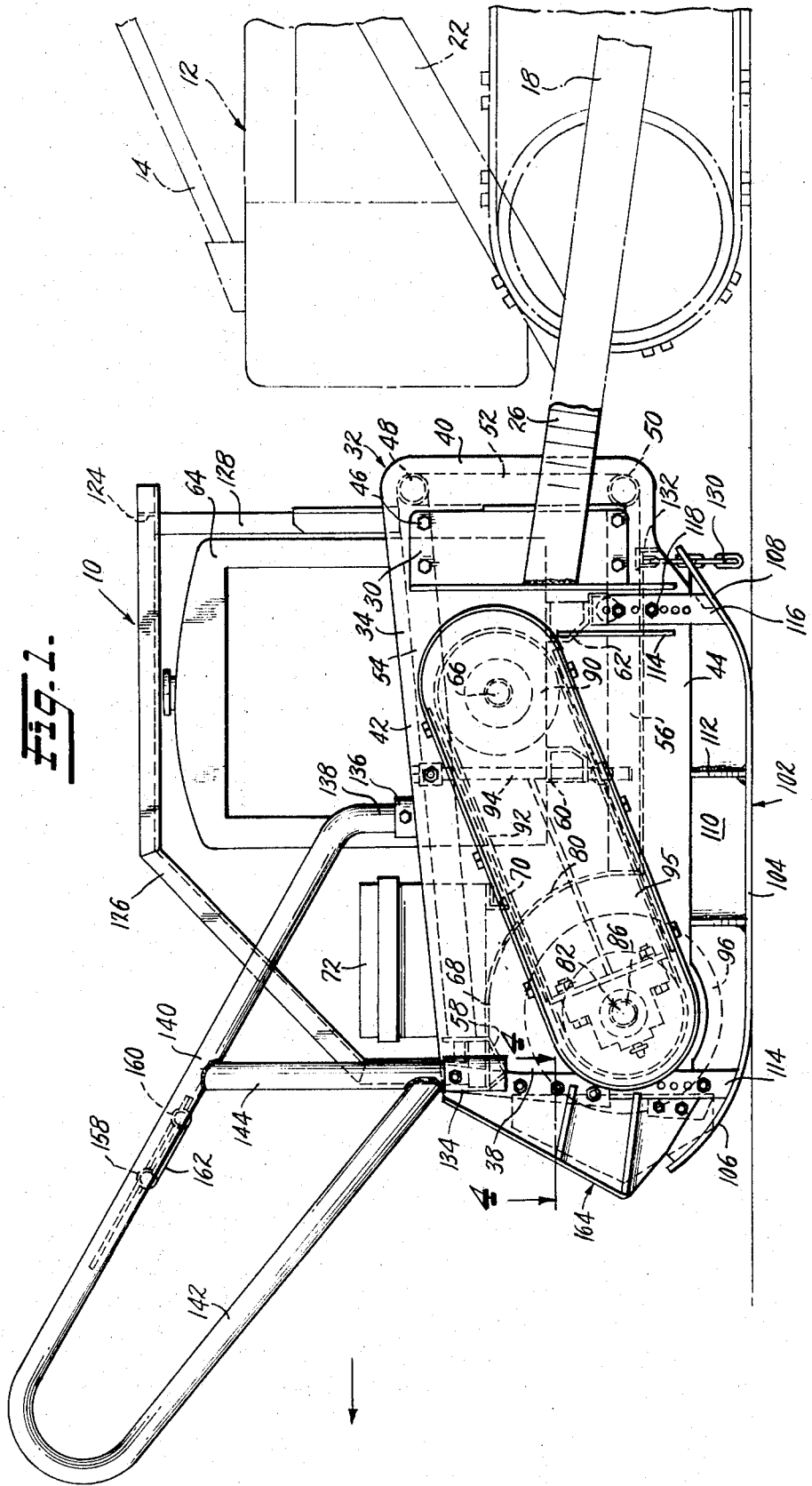

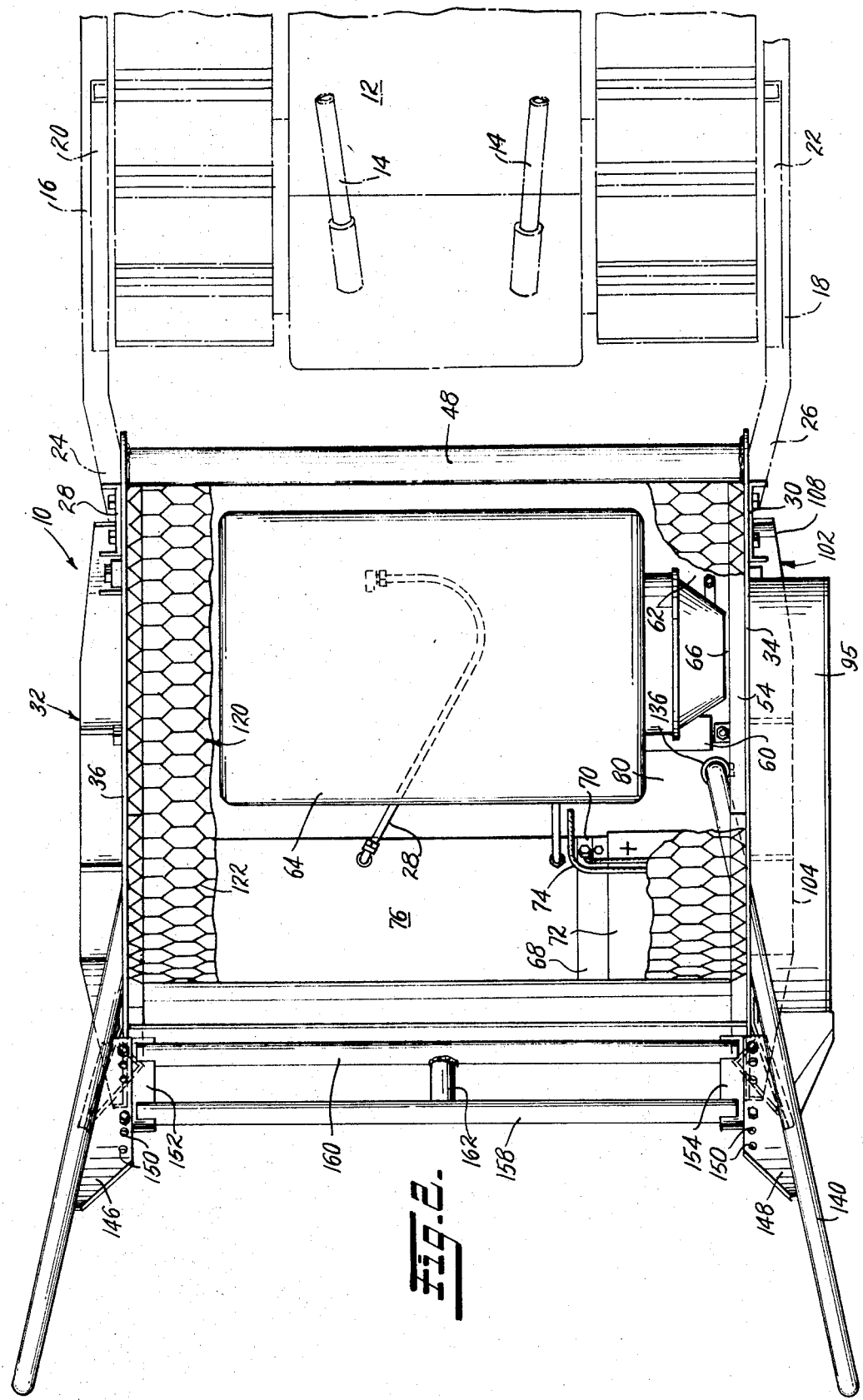

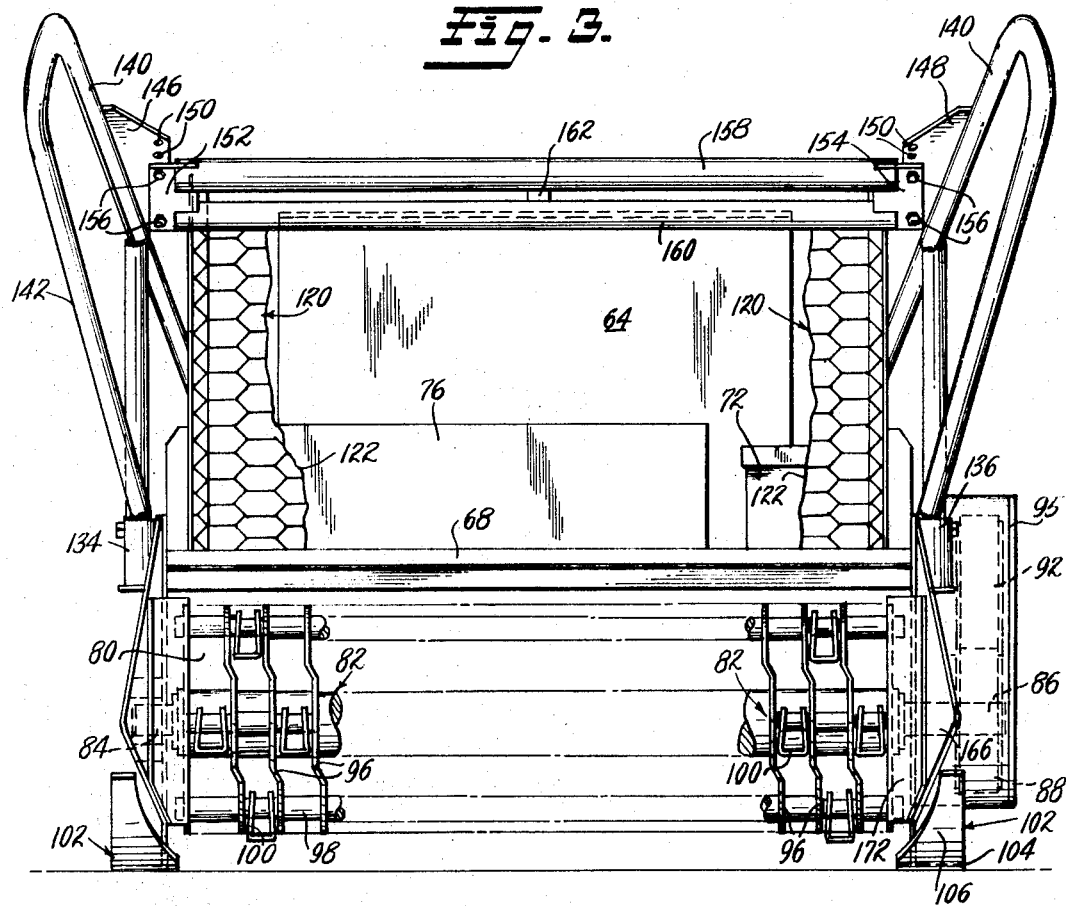
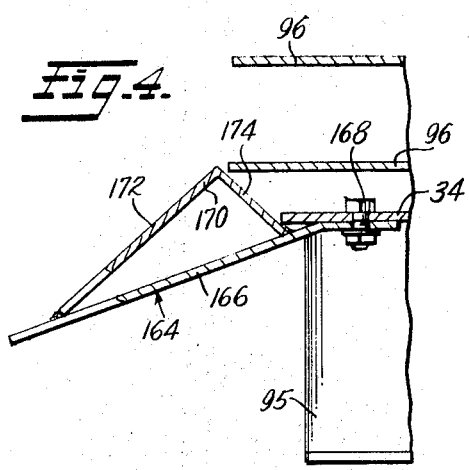
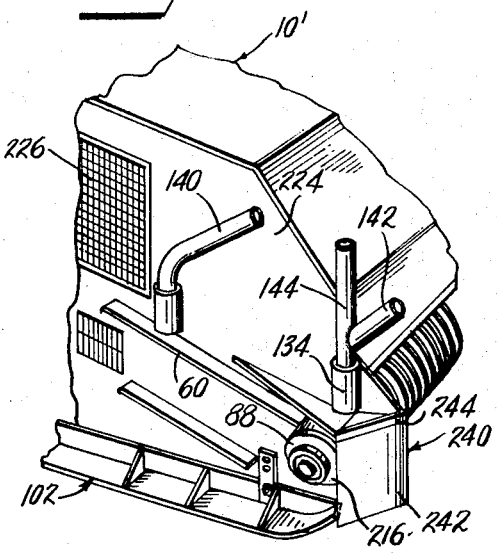

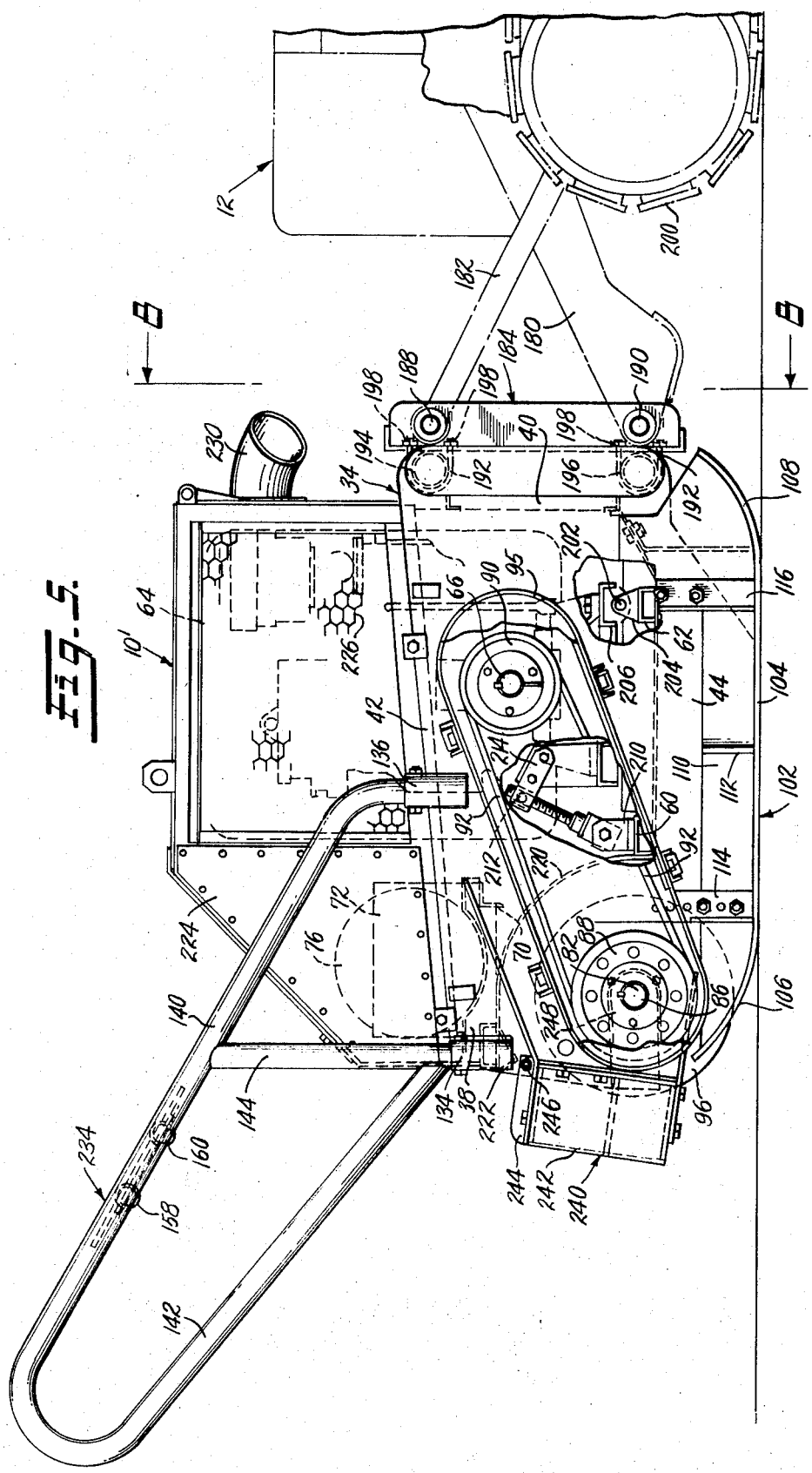

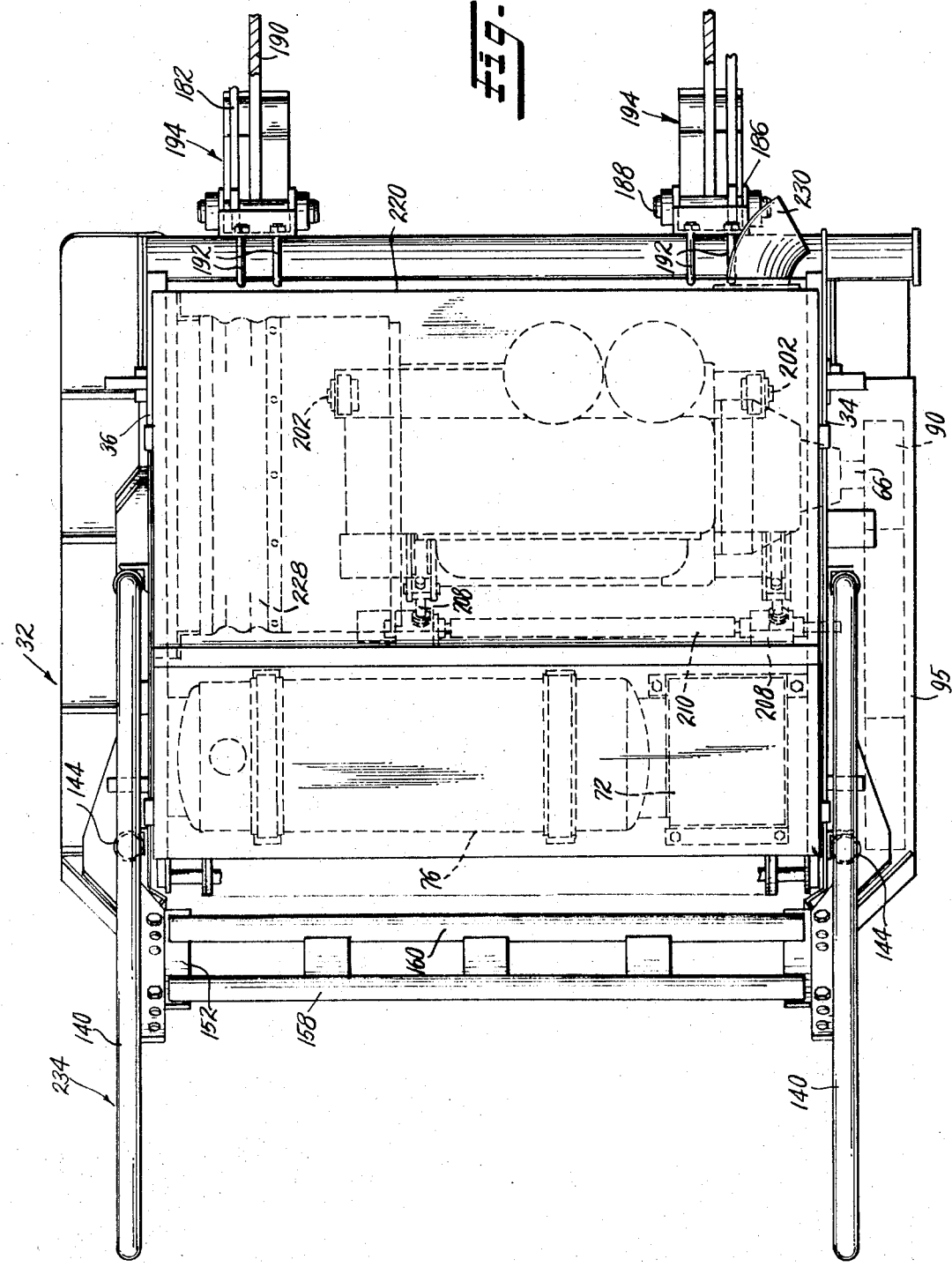

3,844,096

BRUSH AND TREE MASTICATOR

BACKGROUND OF THE INVENTION

1. Field of the Invention

This invention relates to apparatus for shredding and disposal of vegetation, particularly to that type of unit employed in site clearance and the like for reduction of "slash" after logging.

2. Description of the Prior Art

Devices intended to shred vegetation by flail action have been heretofore proposed and various shredding and bulk reduction units for vegetation are currently marketed. Such units have encountered operating difficulties related to clogging and malfunction occasioned by entry of vegetation into the components.

SUMMARY OF THE INVENTION

Apparatus in accordance with the present invention finds its principal utility in the bulk reduction of growing or previously cut vegetable matter such as brush, small trees, and the like. The unit serves to shred or masticate this material into fine particles which may be readily gathered and transported, if desired, or may simply be left in place serving as mulch or soil additive. The use of machinery of this type is dictated by increasing concern environmentally over site clearance procedures involving burning of excess vegetation.

As indicated above, earlier flail-type shredders have been subjected to clogging when operated in heavy growth by the entry of materials into the operating components. Also, where attempts are made to operate heavy duty flails from a prime mover power source, serious overloads on the power source occur. The unit hereof is prime mover mounted, but includes a power source independent of that of the prime mover. Moreover, the unit combines an effective vegetation gathering system with a new and novel deflector plate system which precludes the introduction of unmasticated vegetation into the flail operation area of the device.

Further objectives include the provision of a unit as aforesaid which is of heavy and reliable construction, non-complex assembly, and positive operation.

Other and further objects and advantages of the invention would become apparent to those skilled in the art from a consideration of the following specification when read in conjunction with the annexed drawings.

BRIEF DESCRIPTION OF THE DRAWINGS

FIG. 1 is a side elevational view of the apparatus of the present invention.

FIG. 2 is a plan view with portions omitted of the apparatus of FIG. 1.

FIG. 3 is a front elevational view with portions omitted.

FIG. 4 is an enlarged fragmentary horizontal sectional view, taken on the line 4—4 of FIG. 1 showing one of the deflector plates.

FIG. 5 is a side elevational view of a modified form of the apparatus.

FIG. 6 is a plan view, partly in section, of the apparatus of FIG. 5.

FIG. 9 is a fragmentary perspective view of the left side of the apparatus of FIG. 5 showing particularly the chaff screen on the clean-out part.

With respect to both embodiments, like elements carry like numerical designations.

DESCRIPTION OF PREFERRED EMBODIMENTS

Figure 7:
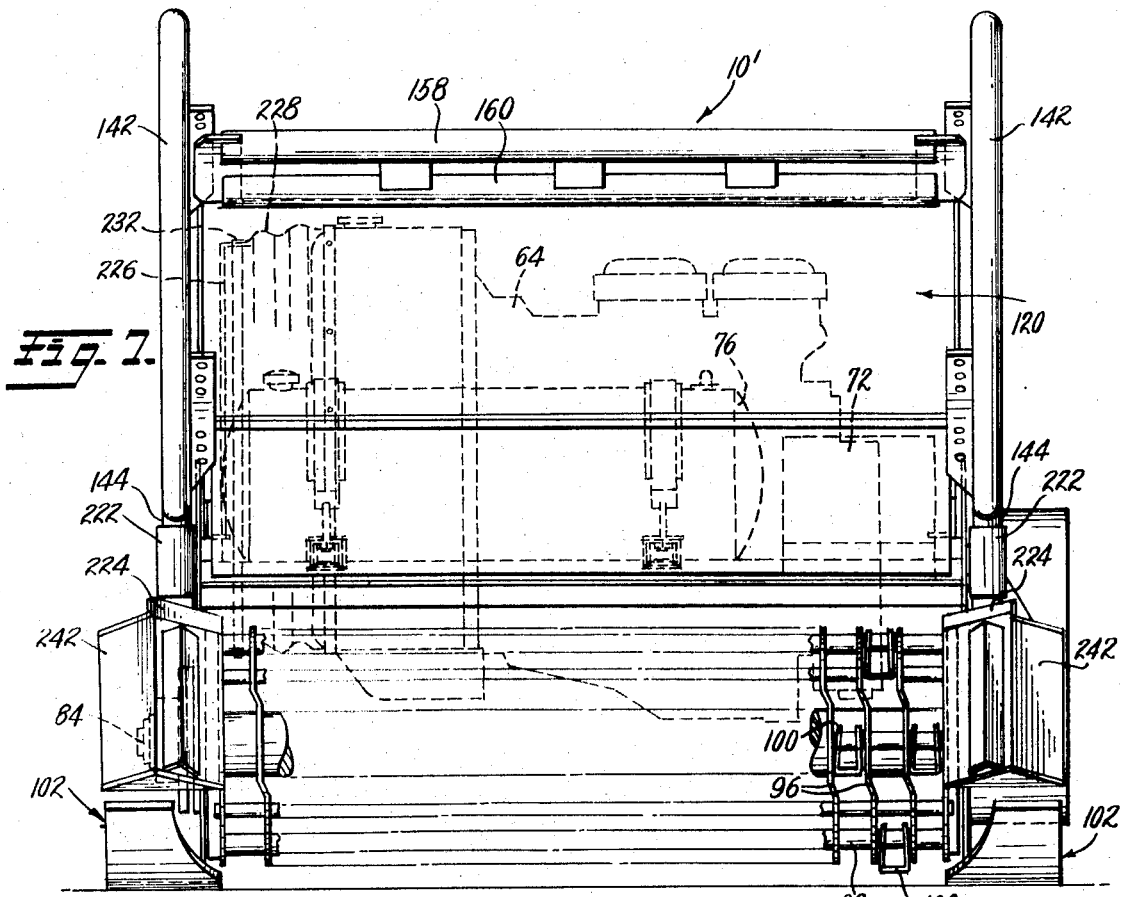
FIG. 7 is a front elevational view with portions omitted of the apparatus of FIG. 5.

Referring to FIGS. 1 through 5 inclusive in more detail, a shredding unit hereof, in one form, is therein generally identified by reference numeral 10. The unit 10 is adapted for mounting forwardly of a prime mover, such as a tractor 12, preferably of the heavy duty, tracked variety. The tractor 12 is fitted with protective bars 14. A pair of outboard, elongated lift arms 16, 18 are mounted on the tractor, each having a lift brace, 20 and 22 respectively. The arms have inturned outer or front ends 24 and 26, fixedly secured to vertical mounting plates 28 and 30, further described below.

The unit 10 is otherwise self contained, and comprises a housing 32 composed of elongated side plates 34 and 36. The side plates each have opposite leading and trailing end portions 38, 40, and top and bottom sections 42, 44. The vertical mounting plates 28 and 30 are secured, by changeable fastening devices 46, to the plates adjacent the trailing end portions 40 thereof. Means interconnect the plates and secure the same in spaced apart, parallel relation. Such means include a pair of tubular rear braced bars 48 and 50, with vertical end bars 52. Extending forwardly are side braces 54 and 56, the braces 54 being connected to a front cross member 58 of inverted U-form.

At a generally midlength location, a pair of engine mounting cross elements 60, 62 are provided. Secured on these elements is an engine 64, preferably of the diesel variety shown here in outlined form only. The engine includes a power take-off shaft 66 which extends through the side plate 34. Also extending between the side plates is a pair of forward mounting members 68 and 70. On these is mounted a battery 72 for supplying electrical energy to the engine through leads 74, and a fuel tank 76 with a hose 78.

A curved hood 80 is fixedly secured between the side plates to protect the engine and to deflect downwardly the material subjected to the action of the flails. The hood 80 is also secured to the forward ends of the side braces 56.

A main axle 82 of substantially cylindrically elongated form extends between the side plates and has reduced diameter ends 84, 86 which are rotatably mounted in bearings in the side plates. In FIG. 3 it will be observed that the end 86 carries a driven pulley 88. Similarly, the power take-off shaft 66 has an aligned drive pulley 90 thereon, the pulleys being drivingly connected together by a belt 92. A conventional tension adjustment rod assembly 94 is provided for belt tightening and loosening. By this means, rotary motion is imparted to the axle 82. The belt and wheels are encased in a suitable shroud 95.

The axle and flail assembly per se are highly similar to that previously known in the art — see particularly Rousseau et al, U.S. Pat. No. 3,574,989. In this regard, the axle carries a series of disc members 96 which have a plurality of shafts 98 extending therethrough adjacent their outer ends. The shafts carry loosely mounted knives 100 of U-form between the discs, which operate in flail fashion to shred vegetation upon impact therewith.

Ground support for the unit comprises a skid assembly 102 for each side plate. The skid assemblies each include a ski 104 with upturned end sections 106 and 108. The assemblies also each have an upright 110 with strengthening ribs 112, and mounting braces 114, 116 each having a vertical series of holes therein. Fasteners 118 extend through the openings and secure the skids adjustably to the side plates.

The engine and associated components are protected by a portective shroud 120. Such shroud includes a latticework of expanded metal 122 secured forwardly to the forward mounting member 68, and at the rear to a top cross member 124. Side and upright braces 126, 128 are further provided as required by the particular configuration of the upper side components.

As shown in FIG. 1, a series of short chain lengths 130 depend from across frame member 132 serving to prevent forceful expulsion of matter such as cans, large pieces of vegetation and the like from the undercarriage of the unit.

The efficiency of the unit in maintaining a uniform swath of cut is enhanced by the provision of a gathering arm system. A gathering arm is supplied for each side of the un;it, and comprises a socket 134 exteriorly of each plate, and a second socket 136 fixedly secured to the inner sides of the plates. Each of the sockets has a lock nut therewith. The sockets 136 each receive a downturned inner end 138 of a tubular top arm section 140. An integral bottom arm member 142 is secured to a vertical brace 144 which is connected to the top arm member and is seated in socket 134. At substantially intermediate locations each of the top members has a plate 146 and 148 thereon, the plates having series of openings 150 therein. Brackets 152 and 154 are adjustably secured to the plates 146 and 148 by fasteners 156, and tubular cross members 158 and 160 extend therebetween. A central sleeve 162 strengthens the cross members. It will be observed that the gathering arm system thereby tends to gather and to depress materials in the path of travel of the unit.

In order to prevent entry of unshredded material between the side plates and the adjacent disc members, deflector plates 164 are provided — shown best in FIG. 4. The plates are multi-part, including an outer member 166 with an inturned section for connection, by screw and bolt means 168, to the side plates 34. The inner section 170 has a leading portion 172 and a trailing portion 174. As shown in the drawing, the portion 172 extends inwardly to a depth such that it blocks entry of material between the plate 34 and the next adjacent disc 96.

Figure 8:
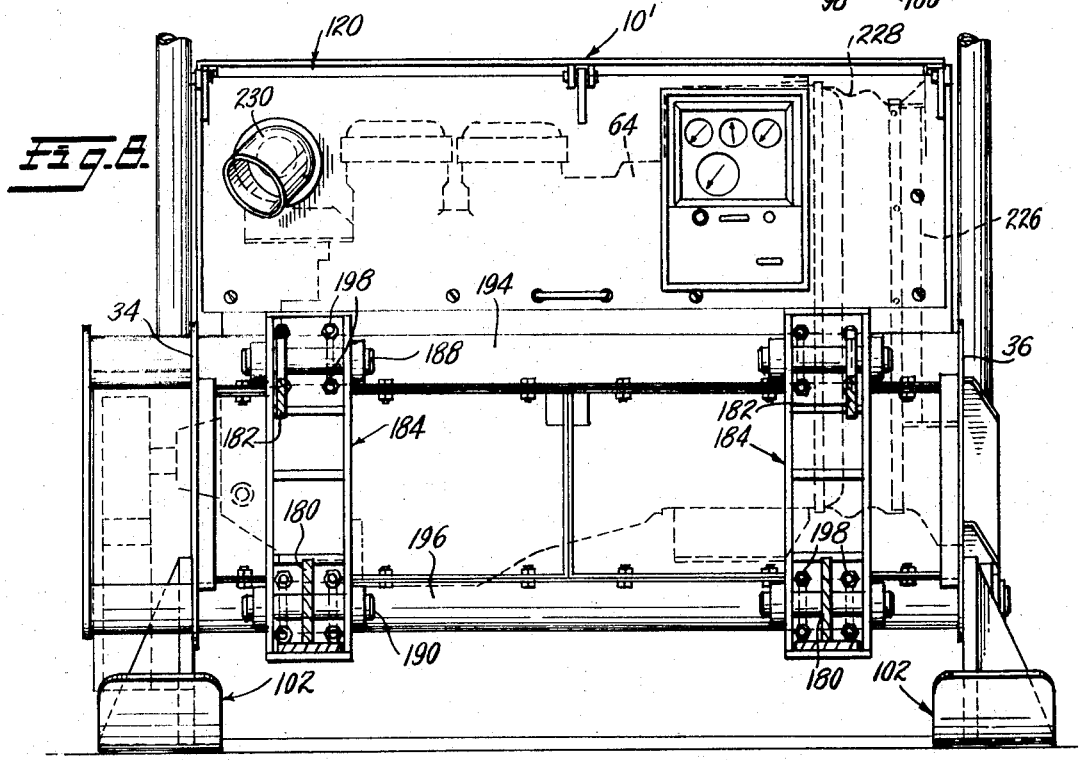
FIG. 8 is a rear elevational view, partly in section, taken on the line 8—8 of FIG. 5.

Referring next to FIGS. 5–9 inclusive, an alternate form of the brush and tree masticator is shown. In all figures, like elements carry like numerical designations. In this respect, and in contrast to the prior described embodiment, the engine of unit 10' is completely enclosed in a steel canopy for protection against weather and falling timber with expanded metal side covers on the sides of the canopy to afford additional protection while permitting an ample air supply to reach the engine. Completely enveloping the engine in a canopy permits the interior of the canopy to be pressurized, scours the engine of ignitable chaff and prevents entrance of dust to the engine compartment. The perforated metal corrugated chaff screen is easily cleaned with the air intake for the engine located behind the chaff screen. The second embodiment of the invention has stressproof journals for the rotor and is highlighted by: wider adjustable skids for better flotation, single point belt adjustment, snap locks for quick removal of the belt guard, and the canopy cooperates with parallel, forwardly directed gathering arms to insure movement of the uncut brush into the path of the knives.

Again, the unit 10' is adapted for mounting forwardly of a prime mover such as a tractor 12 which can be either of the wheel or crawler type and may be equipped in this case with a loader or a bull dozer. The tractor as illustrated is of the heavy duty, tracked variety and has extending from the front of the same, a pair of heavy, downwardly inclined lift arms 180 from each side which may in fact comprise in conjunction with paired upwardly inclined lighter arms 182, the means for adjustably positioning a bull dozer blade (not shown) which in this case has been removed to permit the tractor to drive unit 10' across the ground and in front of tractor 12. In this respect, the arms 180 and 182 on respective sides of the tractor are coupled at the top and bottom to mounting plates 184 which are U-shaped in horizontal cross section and have extending through side flanges 186, upper and lower cylindrical bars 188 and 190 respectively, thus permitting the outer ends of the arms 180 and 182 to pivot about the axis of bars 188 and 190. The mounting plates 184 carry adjacent to the ends of bars 180 and 182 respectively, multiple pairs of U-shaped mounting brackets 192 which ride on upper and lower mounting bars 194 and 196 which are fixed at their extreme ends to unit 10' and extend horizontally in spaced parallel fashion. The brackets 192 may be formed of rod material bent into U-shaped configuration and are threaded at their ends such that they are coupled to the mounting plates 184 by nuts 198. Thus, with the mounting bars 194 and 196 being formed of hollow metal pipe, the brackets 192 slide axially on the pipe and laterally of unit 10 to permit alignment of the right hand edge of the cut with the edge of the right hand track 200 of tractor 12.

Unit 10', similar to unit 10 of the prior embodiment, is otherwise self contained and canopy covered, and comprises a housing 32 composed of elongated side plates 34 and 36. The plates each have opposite leading and trailing end portions 38, 40, and top and bottom sections 42, 44. Means interconnect the plates and secure the same in spaced apart, parallel relation. Such means include the pair of mounting bars 194 and 196 which connect the trailing end portion 40 of both side plates 34 and 36 by being welded thereto. Additional transverse frame members are provided at longitudinally spaced positions with respect to the side plates 34 and 36 to form a rigid housing. In addition, a pair of longitudinally spaced engine mounting cross elements 60 and 62 are provided which span the side plates and permit adjustable lifting of the engine mount in this embodiment. The engine mount 206 is pin coupled on one side via pins 202 and flanges 204 to the fixed transverse cross element 62, while on the opposite side threaded screws 208 are pivotably coupled at one end to the other transverse cross element 60 and each has a threaded nut 212 at its outboard end which permits an arm 214 which is in turn coupled to the opposite side of the engine to be adjustably moved in the direction of the axis of screw 208 causing the engine 64 to tilt about a horizontal axis as defined by pin 202. Paired screws 208 are provided on each side of the engine 64 as seen in FIG. 6 and cooperate with cross shaft 210 through a gear box which engage the nuts 212 attached to the engine mount to raise or lower the engine at one side. Since the cross shaft 210 extends through the side 34, it is possible to remove, install or adjust the drive belts from one location, and tension is effected to the drive belt by pivoting the engine about the axis of mounting pins 202.

The engine 64 is preferably of the diesel internal combustion variety and is illustrated herein in outline form only. The power take off shaft 66 extends through side plate 34 and has fixed thereto a drive pulley 90, FIG. 5. Also extending between the side plates 34, 36, are a pair of forward mounting members 68 and 70 which extend in parallel fashion and support battery 72 for supplying electrical energy to engine 64 and a fuel tank 76 which is also coupled thereto.

A main axle 82 extends between side plates 34, 36 supported by heavy duty bearings 216 mounted on respective side plates; the axle 82 having reduced diameter ends 84, 86, with the reduced diameter end 86 having fixed thereto a driven pulley 88. Pulley 88 is connected to pulley 90 by belt 92 whose tension is adjusted by means of the dual screws 208. By this means, rotary motion is imparted to axle 82. A removable shroud 95 encases the belt and wheels to protect the same.

The axle and flail assemblies are identical to the embodiment previously described with the axle 82 a series of axially spaced disc members 96 which in turn support a plurality of shafts 98 extending therethrough with the shafts positioned near the periphery of the disc and being circumferentially spaced with respect to the disc. The shafts carry loosely mounted knives 100 of U-shape which loosely pivot on the shafts and operate in flail fashion upon rotation of shaft 82 to shred the vegetation upon impact therewith.

The ground support for the unit comprises in similar fashion to the prior embodiment, a skid assembly 102 at each side plate. However, the skids have been moved rearwardly in this unit relative to their position in that of the prior embodiment. Skid assemblies each comprise a ski 104 with upturned end sections 106 and 108. The assemblies also each have a vertical upright 110 with rigidifying ribs 112 at spaced positions and through longitudinally spaced, vertical mounting braces 114 and 116 the skids are coupled to respective side plates in an adjustable manner in similar fashion to that of the prior embodiment by use of casters 118.

Rather than having the engine and associated components being merely protected by a protective shroud 120, the present embodiment employs a hood 220 which functions as a structural cross member and not only surrounds approximately 100° of the rotor but also extends back to the rear of the side and is welded along the full length of the side plates 34, 36. Further, a forward angled portion 222 acts to deflect the cut material towards the ground and/or back into the flail blades 100. The protective shroud or canopy 120 surrounds the engine and associated components but in this case the top, rear wall and the front wall as well as section 224 of the side walls are imperforate and tend to fully enclose the engine. Cooling air is drawn by the engine fan through a projected chaff screen 226 on the left hand side wall and is secured to the engine radiator shell by tubular flexible boot 228, FIGS. 6, 7, so that in effect the engine fan operates as a ducted fan. In order to pressurize the compartment defined by the engine housing 120, the outlet screen leading to discharge duct 230 is partially blocked to provide a slight positive pressure in the compartment and to prevent the infiltration of dust. The boot 228 of irregular tubular form is flexible to permit the engine 64 to move (in belt adjustment) relative to the fixed chaff screen assembly 232 upon which screen 226 is mounted of which screen 226 forms a portion. This type of enclosure permits the use of filtered air for engine aspiration through the normal engine air cleaners but also provides that means to contain a fire suppressant agent (not shown) which may be manually or automatically triggered. The outlet air panel is slidable vertically and provides access to the engine clutch and other engine controls.

Rather than employing a series of short chain lengths as 130 in the prior embodiment, preferably a heavy reinforced rubber baffle (not shown) is employed which prevents large pieces of vegetation, cans, debris and the like from moving from the undercarriage of the unit and into the path of the prime mover 12. In similar manner to the prior embodiment, a uniform swath is cut, enhanced by the provision of gathering arms, one to each side of the unit 10'. However the gathering arms identified generally at 234 are each mounted in paired sockets 134–136, socket 136 receiving a downturned inner end 138 of a tubular top arm section 140 with vertical brace 144 extending downwardly from the tubular top arm section 140 intermediate of its ends and being received within the more forward socket 134, sockets 134 and 136 being fixed respectively to each side plate 34, 36. Bottom arm member 142 constitutes an integral extension of the upper or top arm section 140 and terminates at vertical brace 144 just above socket 134. In like manner to the prior embodiment, tubular cross members 158 and 160 extend laterally between the top arm sections 140 of each of the gathering arms 234 and tend to deflect gathered material downwardly. In this case, the gathering arms 234 are parallel and anything which is gathered will be cut. The mounting of the cross members 158 and 160 is achieved by means of brackets 152 and 154.

Modified deflector plates are employed in the rotor area at the forward end of the machine as indicated at 240, in this case the plates are formed of heavy gauge sheet metal stock, wherein a vertical contact plate 242 of generally regular configuration is mounted so as to be inclined rearwardly and outwardly and therefore deflect the unit away from a tree or other large object which would not or could not be cut and which could conceivably damage the unit, and in this respect, the deflector plate as an assembly comprises means for mounting the plates 242. A mounting plate 244 to each assembly is bolted by way of bolt 246 at the top of the side plate and a rearwardly extending mounting arm 248 which is welded to mounting plate 244 and extends rearwardly therefrom, defines the position of the outwardly diverging deflector contact plates 242 of the deflector plate assembly 240. Modifications have been made to the lower forward corners of the side plates to permit a piece of material which is crosswise of the machine to get into the rotor for cutting and to facilitate entry of such material, the skids have been moved back, such that the portion 106 at the forward end of each ski 104 terminates just behind the leading edge of the multiple discs 96. However, the entry of unshredded material into the bearing area is prevented by a labyrinth formed by an annular ring which is part of the rotor end plate and a heavy nut plate which secures the rotor bearing to the side plate. In operation, the embodiment illustrated in FIGS. 5–9 inclusive operates in similar fashion to that of the embodiment illustrated in FIGS. 1–4 inclusive.

What is claimed is:

1. In a self-contained brush and tree shredding unit for attachment to a prime mover, the unit including a rotatable main axle, a plurality of spaced, coaxial disc members fixed to said axle, a series of shafts extending through the disc members at circumferentially spaced positions near the disc peripheries, a plurality of knives loosely mounted on said shafts between discs, and the knives being loosely mounted on the shafts for movement in flail fashion upon rotation of the main axle, the improvements comprising:

a housing comprising side plates and means extending between and connecting the side plates;
   means projecting from the side plates to secure the unit to the prime mover, said means providing for adjustable height mounting of the unit relative to the prime mover;
   said main axle extending between the side plates;
   an engine on the housing, and a protective shroud about the engine;
   means drivingly connecting the engine to said main axle to impart rotation to the main axle;
   said main axle carrying the disc members and supporting the shafts to carry the knives in an arc of rotation of a maximum depth within the limit of extent of the side plates;
   a skid assembly for each side plate, each skid assembly comprising an upright, a ski member having upturned, curvilinear end sections, and a pair of mounting brackets;
   means adjustably connecting the mounting brackets to the side plates;
   a gathering arm for each side plate, the gathering arms each comprising a substantially vertical brace, an elongated outwardly angled top member fixed to the housing at a proximal end thereof, and a bottom member extending forwardly and outwardly from the brace and integral at its distal end with the distal end of the top member; and
   a deflector plate at the leading end of each side plate below said arm to prevent entry of material between the side plate and the adjacent disc members.

2. The improvement of claim 1, wherein at least one top rod interconnecting the respective gathering of arms to depress any material contact thereby.

3. The improvement of claim 1, wherein: the deflector plate includes two sections, one of such sections extending inwardly to a depth at least equal to the location of the adjacent disc.

4. The improvement of claim 1, wherein: the means drivingly connecting the engine to the axle includes a belt.

5. The improvement of claim 1, wherein: said housing comprises an imperforate canopy generally enclosing said engine, a screen is provided within one side wall of said housing permitting the entry of filtered air to the housing interior, and said housing further includes air discharge means on the wall facing away from said gathering arms; whereby, positive air pressure within said enclosure prevents entry of debris and facilitates engine operation.

6. The improvement of claim 1, further comprising: a curved hood overlying said rotatable discs carried by said main axle, spaced radially therefrom, and extending about said disc circumferentially over an angle of approximately 100° and positioned above and to the rear of said main axle, with the leading edge of the said hood terminating forwardly and downwardly so as to direct material to be cut towards the ground and in front of said unit.

7. The improvement as claimed in claim 5, wherein said engine is mounted on said housing between said side plates and includes an engine drive shaft extending through one of said drive plates and has fixedly coupled to the protruding end of said drive shaft, a drive pulley, said main axle also extends through said one side plate and carries on said extension a driven second pulley fixed thereto and an endless belt coupled to said pulleys to permit said main axle to be driven upon energization of said engine, and wherein means are provided for pivoting said engine about one lower side edge thereof such that the distance between said engine drive shaft and said main axle varies to vary the tension within said belt coupling said pulleys.

8. The improvement as claimed in claim 6, wherein said engine comprises a radiator mounted at one end thereof and a flexible boot of tubular construction is fluid coupled at one end to said screen and at the other end to said engine radiator to control air delivery to said housing interior regardless of the pivotable adjustment of the change in inclination of said engine to effect tensioning of said belt.

9. The improvement as claimed in claim 1, wherein said means projecting from the side plate to secure the unit to the prime mover and to provide for adjustable height mounting of the unit relative to the prime mover comprises: a pair of round bars extending between said side plate at the rear of said unit at spaced vertical positions, said prime mover includes paired upper and lower arms extending outwardly therefrom in laterally spaced fashion, a mounting plate is pivotably mounted at upper and lower ends to respective upper and lower arms at each side of said prime mover and U-shaped brackets are fixed to said mounting plate at vertically spaced positions defined by said bar and surround said bar but are slidable thereon.

* * * * *